April 21, 1964 B. BURLEY 3,130,319
ELECTRONIC SYSTEM INCLUDING A PLURALITY OF SELECTIVELY-OPERABLE
CONDITION-RESPONSIVE CONTROLS
Filed June 29, 1962 2 Sheets-Sheet 1
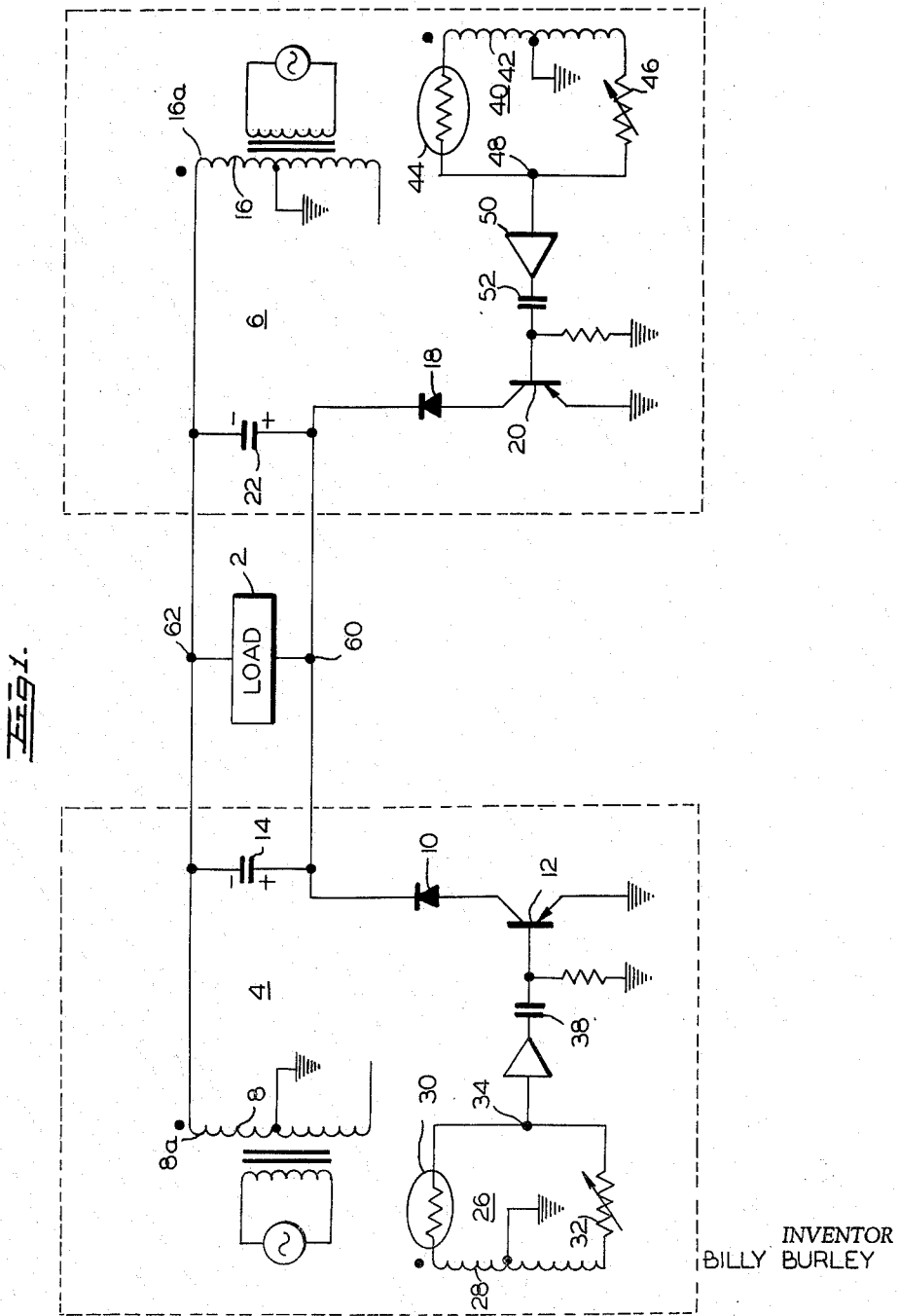
INVENTOR
BILLY BURLEY
BY Scrivener & Parker
ATTORNEY

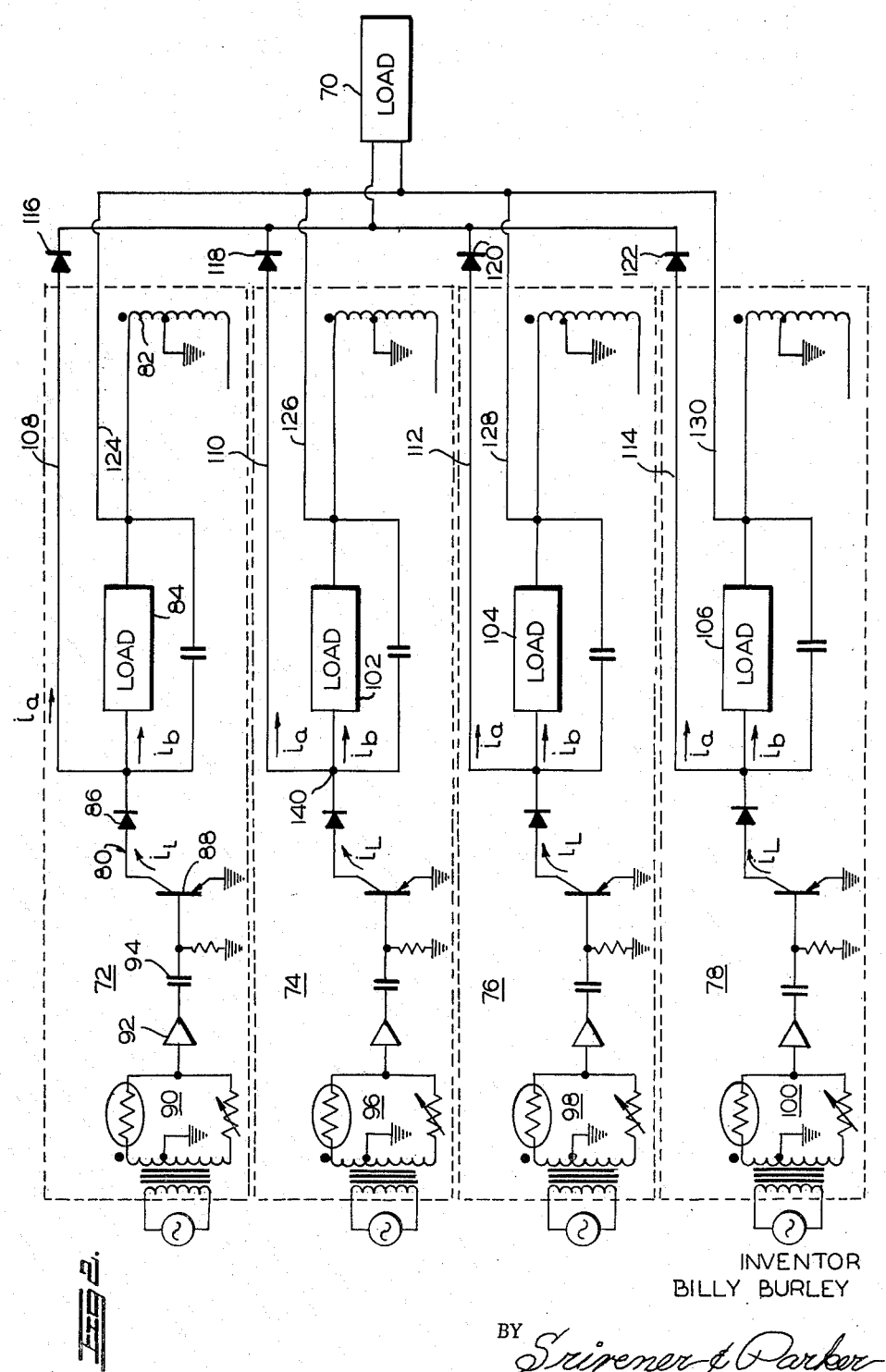

United States Patent Office 3,130,319
Patented Apr. 21, 1964

3,130,319
ELECTRONIC SYSTEM INCLUDING A PLURALITY OF SELECTIVELY-OPERABLE CONDITION-RESPONSIVE CONTROLS
Billy Burley, Dallas, Tex., assignor, by mesne assignments, to Johnson Service Company, Milwaukee, Wis., a corporation of Wisconsin
Filed June 29, 1962, Ser. No. 206,352
9 Claims. (Cl. 307—29)

This invention relates to an electronic system including a plurality of selectively operable condition-responsive means affording modulating control over a single current-responsive device.

In certain electronic systems it is desirable to afford modulating control over a current-responsive device in accordance with the deviation of a condition from a predetermined value. For example, in the heating and air conditioning art, it may be desired to control the position of a regulating valve in a conduit supplying a temperature-modifying fluid in accordance with the deviation of a sensed condition (for example, temperature) from a predetermined value. Under certain circumstances it may be desirable to selectively control the current-responsive device by one of a plurality of condition-responsive control means. In a multi-zone heating and air conditioning system, for example, control over a master regulator may be desired by one of a plurality of condition-responsive control means that are arranged, respectively, in various zones that are to be temperature controlled. In some installations, modulating control over the regulator may be desired for that condition-responsive control which detects the greatest deviation in temperature from a predetermined value. The present invention relates to a simple, inexpensive, reliable electronic control system having a plurality of selectively operable condition-responsive controls affording modulating control over a single current-responsive load.

The primary object of the present invention is to provide an electronic system having a plurality of condition-responsive means that are selectively operable—in accordance with the magnitudes of the deviations of a plurality of conditions from predetermined values—to afford modulating control over a single current-responsive load.

Another object of the invention is to provide an electronic system having a plurality of condition-responsive means each of which is responsive to a different condition and is operable to afford modulating control over a single current-responsive load, and means for selectively connecting the load with that one of the condition-responsive means which produces the greatest control signal at a given time.

A more specific object of the invention is to provide a system affording modulating control over a current-responsive load that is connected in series in the load circuits of a plurality of condition-responsive controls, said load circuits including diode means arranged in opposition relative to the load for deactivating at least one of the condition-responsive controls when the voltage drop across the load developed thereby is less than that developed by another one of the condition-responsive controls.

Still another object of the invention is to provide an electronic system comprising a plurality of condition-responsive controls each having load circuits including at least two parallel-connected current-responsive loads, one of said loads being common to all of the condition-responsive load circuits, and diode means for de-activating those common-load branches which have a current level below the maximum level of current flowing in any other of the common-load branches. In one embodiment of the invention, a plurality of condition-responsive controls are provided for operating a plurality of current-responsive loads, respectively. These loads may be electro-mechanical actuators controlling the positions of flow regulators arranged in the branch conduits of a multi-zone temperature modifying system. A common current-responsive load (for example, an electro-mechanical actuator controlling a regulator connected in a main conduit of the temperature modifying system) is arranged for selective connection with each of the condition-responsive controls. Diode means are provided which automatically connect the common load with that one of the condition-responsive controls which produces the greatest signal voltage at any given time. By appropriate design or calibration of the system, the common load may be operated by that condition-responsive control which senses the greatest condition deviation at any given time.

Other objects and advantages of the invention will become apparent from a study of the following specification when considered in conjunction with the accompanying drawing, in which:

FIG. 1 is a schematic diagram illustrating one embodiment of the invention wherein one of two condition-responsive controls affords modulating control over a single current-responsive load; and FIG. 2 illustrates another embodiment of the invention wherein a selective one of a plurality of condition-responsive controls affords modulating control over a single current-responsive load, and each of the controls is operable to afford modulating control over one of a plurality of individual current-responsive loads.

Referring to FIG. 1, current-responsive load 2 (for example, the resistance heater of an expansible fluid electro-mechanical actuator) is connected in series in a pair of condition-responsive load circuits 4 and 6. Load circuit 4 includes a grounded center-tapped energizing winding 8 one end 8a of which is connected with ground via load 2, diode 10 and the emitter to collector circuit of grounded-emitter transistor 12. Load circuit 4 also includes capacitor 14 connected in parallel with load 2. Load circuit 6 includes grounded center-tapped energizing winding 16 one end 16a of which is connected with ground via load 2, diode 18, and the emitter to collector circuit of grounded-emitter transistor 20. Capacitor 22 is connected in parallel with load 2. Condition-responsive bridge network 26, which includes a grounded center-tapped energizing winding 28 connected in series with condition-responsive element 30 (for example, a thermistor) and variable resistor 32, has an output junction 34 connected with the base electrode of transistor 12 via amplifier 36 and capacitor 38. Bridge winding 28, which may comprise a transformer secondary winding, is so energized as to establish a given phase relationship between the reference voltage developed by winding 8 and the bridge signal voltage. Similarly condition-responsive bridge 40, which includes grounded center-tapped energizing winding 42, condition-responsive element 44 and variable resistor 46, has an output junction 48 connected with the base electrode of transistor 20 via amplifier 50 and capacitor 52. Windings 16 and 42 are inductively coupled to establish a given phase relationship between the bridge signal and reference voltages. The anodes of diodes 10 and 18 are connected with the collector electrodes of transistors 12 and 20, respectively, and serve to isolate the transistors from the positive half cycles of the reference voltages developed by windings 8 and 16, respectively.

*Operation of the FIG. 1 Embodiment*

Assume that bridges 26 and 40 are temperature-responsive and that transistors 12 and 20 are biased to cut-off. Assume also that resistors 32 and 46 are set to establish balanced conditions of the respective bridges when the zone temperatures sensed thereby equal 75° F.

When both bridges sense zone temperatures of 75°, both load circuits are de-activated and load 2 is de-energized.

Following the teachings presented in my companion application Serial No. 206,348, filed June 29, 1962, and entitled "Condition-Responsive Electronics System," it will be assumed that the phase relationships between windings 8 and 28 and between windings 16 and 42 are such that for deviations in the conditions sensed by bridges 26 and 40 above the set temperature (75° F.), the phase relationships of the amplified signal voltages applied to the base electrodes of transistors 12 and 20 relative to the negative half cycles of reference voltages applied to the collector electrodes via diodes 10 and 18, respectively, prevent conduction of transistors 12 and 20. Consequently, either load circuit will be de-activated if the temperature sensed by the corresponding condition-responsive bridge equals or exceeds set temperature (75°). If both bridges sense zone temperatures above 75°, both load circuits are de-activated and load 2 is de-energized.

Assuming now that bridges 26 and 40 sense zone temperatures of 73° and 75°, respectively, load circuit 6 will be de-activated as described above. A signal voltage will appear at junction 34 of bridge 26 that has a magnitude which is a function of the 2° deviation from set temperature. The signal voltage is amplified and is applied to the base electrode of transistor 12, and since the phase relationship between the signal voltage and the negative half cycles of reference voltage applied to the collector electrode is such as to cause conduction of transistor 12, load circuit 4 will be activated during alternate (i.e., the negative) half-cycles of the reference voltage. The magnitude of the pulsating D.-C. current flowing in load circuit 4 is a function of the magnitude of the signal voltage, and consequently the level of the effective D.-C. current flowing through load 2 is a function of the magnitude of the condition deviation. If the temperature sensed by bridge 26 should decrease to 72° (bridge 40 continuing to sense a zone temperature of 75°), then the magnitude of the signal voltage increases, the impedance of transistor 12 decreases, and the effective D.-C. load current of load circuit 4 increases. Load circuit 6 continues to be de-activated.

Assume now that bridge 40 senses a zone temperature of 74° and bridge 26 continues to sense a zone temperature of 72°. The same load circuit current as before flows in load circuit 4. This current establishes a voltage drop across load 2 which causes load terminal 60 to have a given potential relative to load terminal 62. A signal voltage is produced at junction 48 of bridge 40 which has a magnitude that is a function of the 1° deviation of sensed temperature from set temperature. The amplified signal voltage applied to the base electrode of transistor 20 has such a phase relationship relative to the negative half-cycles of reference voltage developed by winding 16 as to normally cause conduction of transistor 20 and activation of load circuit 6. However, owing to the voltage drop across load 2 by the load circuit current of circuit 4, the potential relationship between junction 60 and the collector electrode of transistor 20 is such as to cause diode 18 to be reverse-biased and load circuit 6 to be de-activated. Consequently load 2 senses only the current flowing in load circuit 4, said current having a level that is a function of the 3° temperature deviation sensed by bridge 26.

Assume now that both bridges sense zone temperatures equal to 72° and that the calibration of the system is such that equal currents flow in the respective load circuits when the two sensed temperatures are equal. The current flowing through load circuit 4 remains the same as before. The amplified signal voltage (which is now a function of the 3° deviation) applied to the base electrode of transistor 20 causes the potential of the collector electrode to increase to a level at which diode 18 is no longer reverse-biased. Load circuit 6 becomes activated and equal currents flow in load circuits 4 and 6. Load 2 continues to sense the same effective D.-C. current level that was sensed when bridge 26 detected a temperature of 72° and bridge 40 detected a temperature above 72°.

If bridge 40 should detect a zone temperature of 71° and bridge 26 should continue to detect a zone temperature of 72°, a signal voltage that is a function of the 4° deviation will appear at junction 48 and will be amplified and applied to the base electrode of transistor 20. The impedance of transistor 20 is decreased, the current flowing in load circuit 6 is increased, and the voltage drop across load 2 is increased. Diode 10 now becomes reverse-biased and load circuit 4 becomes de-activated. Load 2 now senses the load circuit current of circuit 6, which current has a level that is a function of the 4° deviation sensed by bridge 40.

If the temperature sensed by bridge 40 should increase to 73° and bridge 26 should continue to sense a temperature of 72°, diodes 18 and 10 become reverse-biased and conductive, respectively. Consequently, load circuit 6 becomes deactivated and load circuit 4 resumes modulating control over the load. Thus it is apparent that in the electronic control of the present invention, modulating control over the load is obtained by that condition-responsive circuit which has the highest load current at any given time (i.e., that circuit which senses the greatest temperature deviation and has the greatest signal voltage). The sense of response of the electronic controls for deviations in the measured conditions from predetermined values may be reversed in accordance with the teachings presented in my companion application Serial No. 206,343, filed June 29, 1962, and entitled "Electronic System Affording Reversible Modulating Control."

Referring now to FIG. 2, a single current-responsive load 70 is arranged for operation by one of a plurality of condition-responsive control circuits 72, 74, 76 and 78 of the type described with reference to the FIG. 1 embodiment. Load 70 may be an electro-mechanical actuator controlling a regulator arranged in the main conduit of a temperature-modifying system. Control circuit 72 contains a load circuit 80 including a source of reference voltage 82, current-responsive load 84, diode 86, and the emitter to collector circuit of transistor 88. Condition-responsive bridge 90 connected with the base electrode of transistor 88 via amplifier 92 and capacitor 94, controls the impedance of transistor 88 and the level of the effective D.-C. current flowing in load circuit 80. Similarly, control circuits 74, 76 and 78 include condition-responsive bridges 96, 98 and 100 controlling the flow of current through load circuits including condition-responsive loads 102, 104 and 106, respectively. Loads 84, 102, 104 and 106 may be electro-mechanical actuators controlling the positions of regulators arranged in the branch lines of a temperature-modifying system.

In accordance with the present invention, load 70 is connected in parallel with each of the loads of control circuits 72, 74, 76 and 78 by circuit means each of which includes a blocking diode having a given polarity relative to load 70. Thus one terminal of load 70 is connected with corresponding ends of loads 84, 102, 104 and 106 via conductors 108, 110, 112 and 114 including diodes 116, 118, 120 and 122 the cathodes of which are connected with load 70. The other terminal of load 70 is connected with the other ends of the loads via conductors 124, 126, 128 and 130. In effect, each control 72, 74, 76 and 78 has a load circuit including a pair of parallel-connected current-responsive loads one of which (load 70) is common to all of the controls.

*Operation of the FIG. 2 Embodiment*

Owing to blocking diodes 116, 118, 120 and 122, modulating control over load 70 is achieved by that one of control circuits 72, 74, 76 and 78 which has the greatest load current at a given time. Assume that the load circuit transistors of controls 72, 74, 76 and 78 are biased to cut-off. Assume also that the bridges are temperature responsive and that each is balanced when the zone temperature sensed thereby equals a predetermined value (for example, 75° F.). If the sensed temperature of each of the zones should equal 75°, all of the load circuits will be de-activated and load 70 will be de-energized.

Assume that the phase relationships and system calibration are such that when bridges 90, 96, 98 and 100 sense the same temperature below set temperature, the respective load circuits are activated and equal load currents flow through the respective load circuits. If loads 84, 102, 104 and 106 have the same electrical characteristics, then the parallel branch currents ($i_a$) of controls 72, 74, 76 and 78 flowing through load 70 are equal. More specifically, if bridge 90 senses a temperature of 73°, the impedance of transistor 88 is such that a total load current ($i_L$) flows in load circuit 80 which has an effective D.-C. level which is a function of the 2° deviation from set temperature. Since the sum of branch currents $i_a$ and $i_b$ flowing through loads 70 and 84, respectively, equals total load current $i_L$, then both of these branch currents are also a function of the 2° temperature deviation. If bridges 96, 98 and 100 also sense zone temperatures of 73°, the respective load ($i_L$) and branch ($i_a$ and $i_b$) currents flowing in the load and branch circuits of controls 74, 76 and 78 will be equal to the correspondidng currents of control 72.

Assume now that bridge 90 senses a zone temperature of 72° and that bridges 96, 98 and 100 continue to sense zone temperatures of 73°. The amplified signal voltage applied to the base electrode of transistor 88 increases, the impedance of transistor 88 decreases, and the total load and branch currents of load circuit 80 increase as a function of the 1° increase in temperature deviation. Both loads 84 and 70 sense an increase in current that is a function of the 1° increase in temperature deviation from the predetermined value. Branch current $i_a$ of load circuit 80 creates a greater voltage drop across load 70 than is created by branch currents $i_a$ of the load circuits of controls 74, 76 and 78, and consequently diodes 118, 120 and 122 become reverse biased. Only the branch current $i_a$ of load circuit 80 flows through load 70. Since the branch currents $i_a$ of the load circuits of controls 74, 76 and 78 equal zero, the branch currents $i_b$ of these controls equal the respective total load currents $i_L$. The currents flowing through loads 84, 102, 104 and 106, respectively, are a function of the respective temperature deviations sensed by bridges 90, 96, 98 and 100.

Assume now that bridge 96 senses a zone temperature of 72.5°. The load circuit current $i_L$ of control 74 increases as a function of the 0.5° increase in temperature deviation, and since diode 118 is still reverse-biased, branch current $i_a$ equals zero and branch current $i_b$ equals total load current $i_L$. Load 102 senses an increase in current that is a function of the 0.5° increase in temperature deviation. The total load and branch currents of the other controls (72, 76 and 78) remain unchanged.

Assume now that bridge 96 senses a zone temperature of 71°. The total load current $i_L$ of control 74 increases as a function of the 1.5° increase in temperature deviation and the potential at junction 140 is such as to cause diode 118 to be conductive. The branch current $i_a$ of control 74 creates such a voltage drop across load 70 as to cause diode 116 (and diodes 120 and 122) to be reverse-biased. Consequently, control 74 now assumes sole modulating control over load 70. Since diode 116 is reverse-biased, branch current $i_a$ of load circuit 80 equals zero, and the branch current $i_b$ and total load current $i_L$ in this circuit are equal. Since condition-responsive bridges 90, 98 and 100 sense temperatures of 72°, 73° and 73°, respectively, loads 84, 104 and 106 will sense current levels that are functions of 3°, 2° and 2° temperature deviations from set temperature, respectively. It is apparent, therefore, that in the FIG. 2 embodiment, selective control over load 70 by one of the control circuits 72, 74, 76 and 78 is achieved in accordance with the highest condition deviation sensed by bridges 90, 96, 98 and 100. For condition deviations below set temperature, modulating control over loads 84, 102, 104 and 106 is achieved as a function of the respective zone temperatures sensed by bridges 90, 96, 98 and 100.

The condition-responsive bridges may be of the variable resistance, inductance, capacitance or impedance types responsive to similar or dissimilar conditions other than temperature (i.e., responsive to pressure, humidity, magnetic fields, etc., or various combinations thereof). Furthermore, other means (for example, differential transformer means) may be substituted for the bridge networks. While the transistor elements have been illustrated as being of the p-n-p type, it is apparent that with appropriate circuit modifications, transistors of the n-p-n type may be used as well. Other condition-responsive current regulating means (for example, the silicon controlled rectifier means disclosed in my companion patent application Serial No. 206,345, filed June 29, 1962, and entitled "Condition-Responsive Electronic Control"), may be substituted for the transistor current regulators disclosed in the foregoing specification. It will be apparent to those skilled in the art that other changes may be made in the apparatus described without deviating from the invention set forth in the following claims.

What is claimed is:

1. A condition-responsive electronic control, comprising a current-responsive common load having a pair of terminals;
first and second sources of alternating-current voltage having the same frequency and the same instantaneous phase relationship;
first and second uni-directionally conductive devices;
first and second current-controlling means each including a pair of power circuit electrodes and a control electrode;
first load circuit means connecting in series with the load the first voltage source, the first uni-directional conductive device, and the power electrode circuit of said first current-controlling means;
second load circuit means connecting in series with the load the second voltage source, the second uni-directional conductive device, and the power electrode circuit of said second current-controlling means, said conductive devices having the same polarity relative to a common terminal of said load, the polarities of said devices permitting conduction of said current-controlling means; and
first and second condition-responsive bridge network means connected with the control electrodes of said first and second current-controlling means, respectively, each of said bridge network means including an energizing winding connected with the associated voltage source whereby said bridge networks are energized with voltages having the same frequency and phase as said sources, respectively, each of said bridge network means including a pair of branches one of which includes an element having an electrical characteristic that varies as a function of the deviation of a condition from a predetermined value and the other of which includes a bridge balancing element.

2. An electronic system affording selective modulating response, comprising a current-responsive common load;
and a plurality of load circuit means each of which includes a voltage source, a diode and condition-responsive current-regulating means connected in series with said common load, the sources and diodes of said load circuit means, respectively, having the same polarity relative to said load.

3. Apparatus as defined in claim 2 wherein at least one of said load circuit means includes another current-responsive load connected in parallel with said common load.

4. Apparatus as defined in claim 2 wherein the sources of said load circuit means comprise alternating-current voltage sources.

5. Apparatus as defined in claim 4 wherein at least one of said condition-responsive current-regulating means comprises bistable means and alternating-current condition-responsive means controlling the operation of said bistable means.

6. Apparatus as defined in claim 5 wherein said condition-responsive means comprises a condition-responsive alternating-current bridge network.

7. Apparatus as defined in claim 6 wherein said current-regulating means comprises a transistor having an emitter to collector circuit connected in series in said load circuit means and a base electrode connected with said bridge network.

8. An electronic control system comprising
 a plurality of condition-responsive load circuits each of which includes a voltage source, a current-responsive first load, and condition-responsive current-regulating means connected in series with said source and said first load;
 a common current-responsive load;
 a first set of conductors connecting the higher potential ends of said first loads, respectively, with one end of said common load;
 a second set of conductors connecting the other ends of said first loads with the other end of said common load;
 and diode means connected in series, respectively, in the conductors of at least one of said sets, said diode means having the same polarity relative to said common load.

9. Apparatus as defined in claim 8 wherein the source of at least one of said load circuits is an alternating-current source, wherein said one load circuit includes a series-connected diode having the same polarity as said conductor diode means, and wherein the current-regulating means of said one load circuit comprises a condition-responsive bistable device.

References Cited in the file of this patent
UNITED STATES PATENTS 2,585,005    Godshalk et al. _____ Feb. 12, 1952
2,907,932    Patchell _____ Oct. 6, 1959